Oct. 28, 1941.    J. H. HAMILTON ET AL    2,260,518
WASHING MACHINE
Filed Jan. 24, 1938    8 Sheets-Sheet 1

Inventor
John H. Hamilton
David B. Nicholson
By Cushman, Darby, & Cushman
Attorneys Oct. 28, 1941.  J. H. HAMILTON ET AL  2,260,518
WASHING MACHINE
Filed Jan. 24, 1938    8 Sheets-Sheet 2

Inventors
John H. Hamilton
David B. Nicholson

Oct. 28, 1941.   J. H. HAMILTON ET AL   2,260,518
WASHING MACHINE
Filed Jan. 24, 1938   8 Sheets-Sheet 3

Inventors
John H. Hamilton,
David B. Nicholson,
By Cushman, Darby, & Cushman
Attorneys Oct. 28, 1941.   J. H. HAMILTON ET AL   2,260,518
WASHING MACHINE
Filed Jan. 24, 1938   8 Sheets-Sheet 5

Inventors
John H. Hamilton
David B. Nicholson
By Cushman, Darby & Cushman
Attorneys

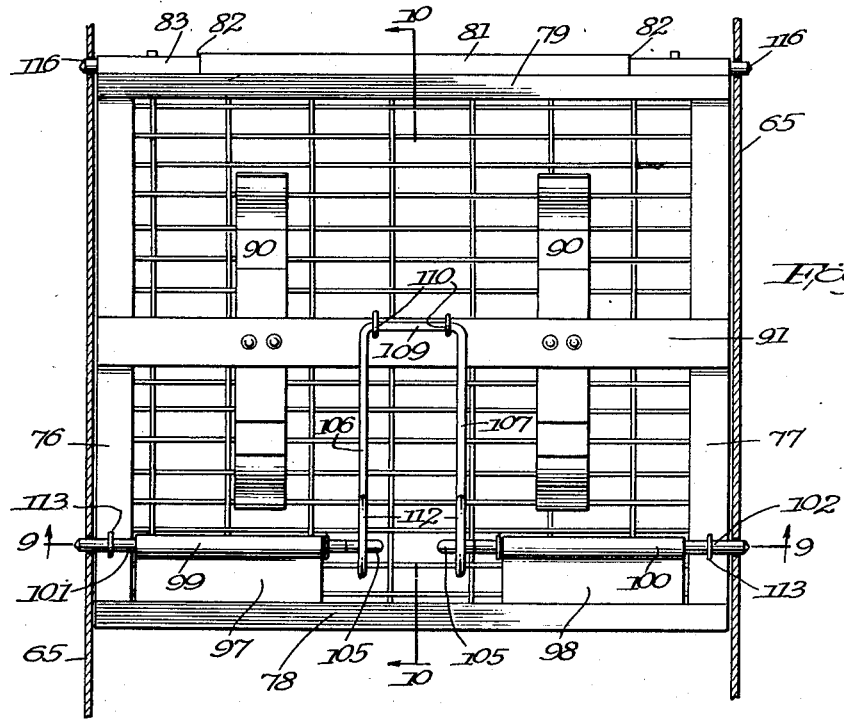
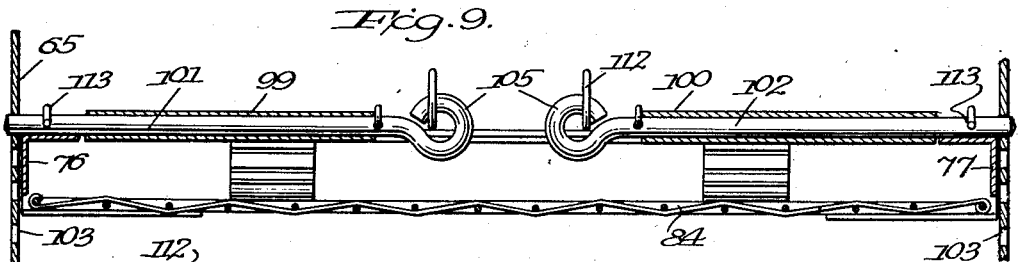
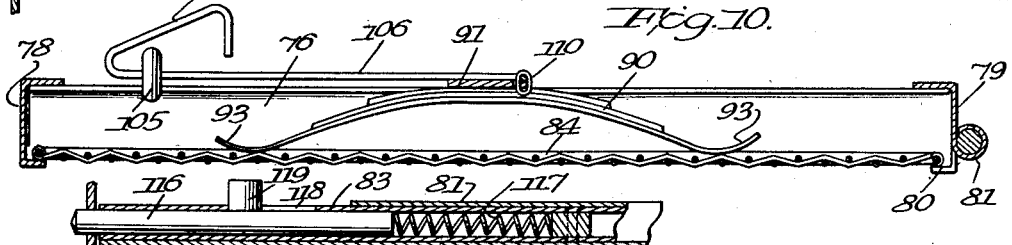
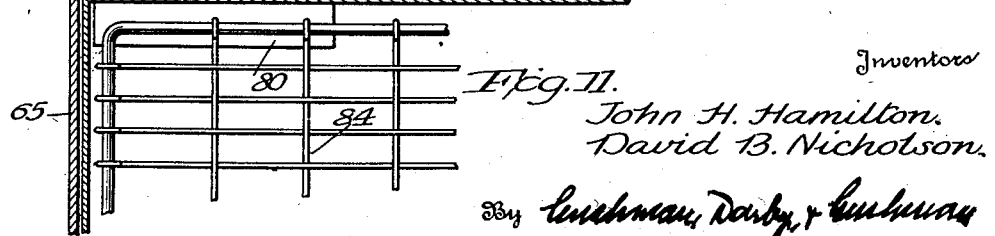

Oct. 28, 1941.      J. H. HAMILTON ET AL      2,260,518
WASHING MACHINE
Filed Jan. 24, 1938           8 Sheets-Sheet 7
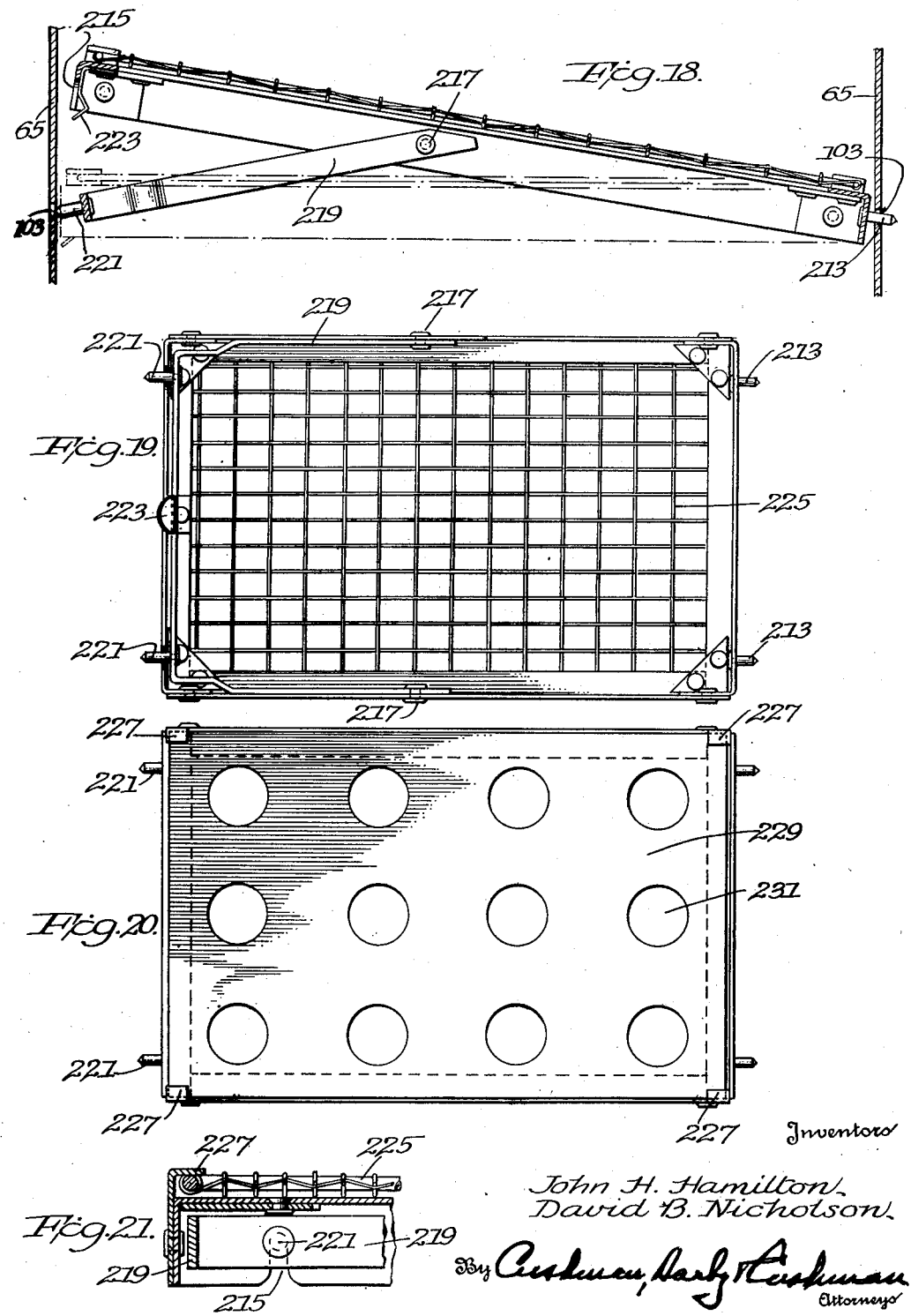

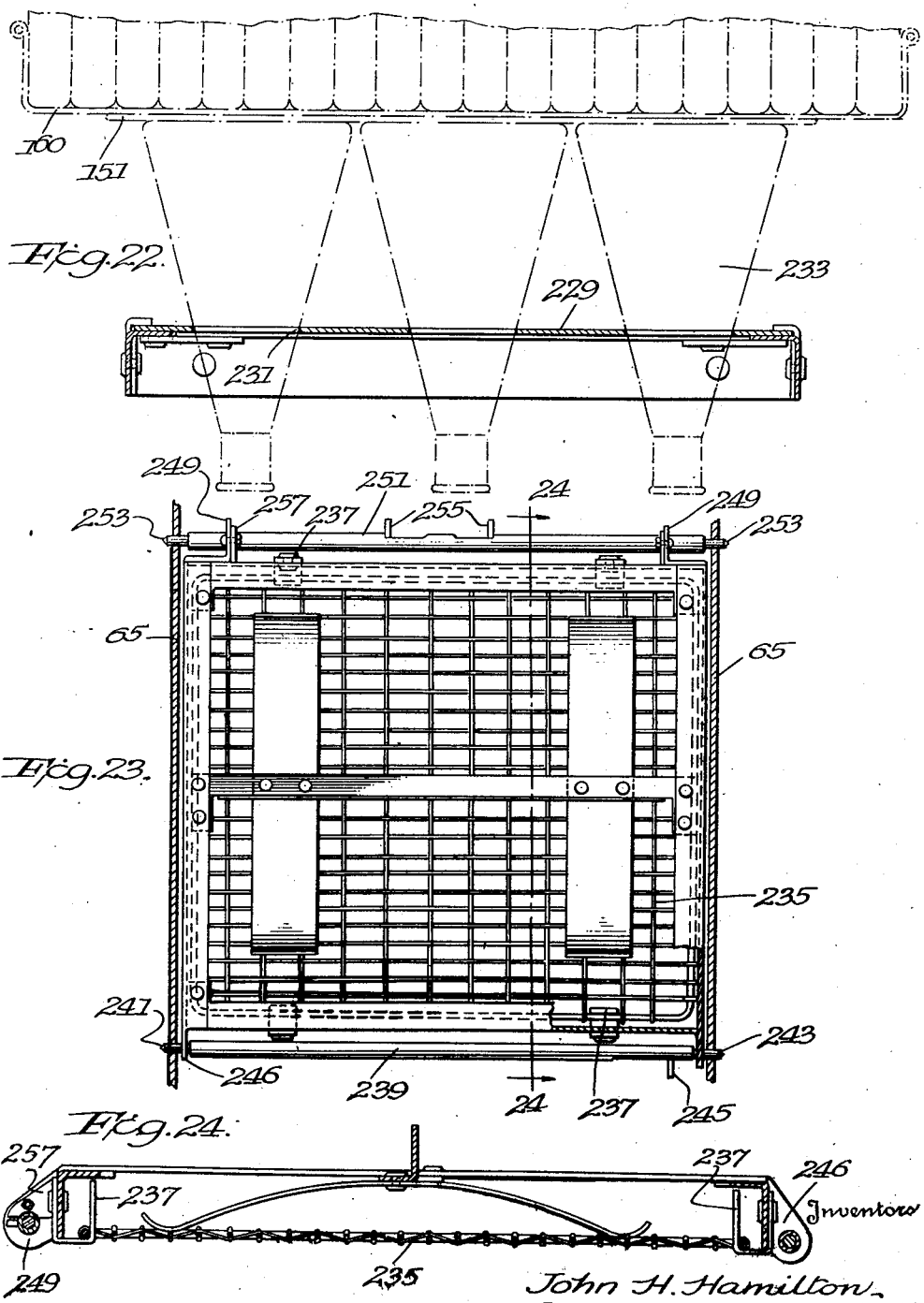

Patented Oct. 28, 1941

2,260,518

UNITED STATES PATENT OFFICE 2,260,518

WASHING MACHINE

John H. Hamilton and David B. Nicholson, Raleigh, N. C.

Application January 24, 1938, Serial No. 186,691

16 Claims. (Cl. 141—9)

The principal object of the invention is to provide an apparatus for washing, soaking, rinsing, sterilizing and storing containers and similar articles.

Another object of the invention is to provide a washing machine for containers and similar articles having compartment forming devices which can be selectively arranged to form a varied number of article receiving compartments of various sizes and shapes to accommodate various types of articles. The machine is characterized by its pronounced compactness, and the availability for use of substantially all of the space within the machine during the washing operations.

In using the apparatus disclosed herein for the cleansing of various types of articles such as containers, it has been found that the articles are more rapidly and thoroughly cleansed than when using conventional apparatus heretofore known.

The drawings disclose a preferred form of the apparatus of the invention, but it will be understood that the details of the construction disclosed may be varied to adapt the invention for different uses.

In the drawings which are illustrative, and in no sense restrictive:

Figure 8 is an outside view of one of the top container compartment sides of the invention;

Figure 9 is a sectional view taken along the line 9—9 of Figure 8;

Figure 10 is a sectional view taken along the line 10—10 of Figure 8;

Figure 11 is an enlarged view of one corner of the container compartment side of Figure 8;

Figure 12 is a partial plan view of the inside of one of the bottom container compartment sides;

Figure 13 is a sectional view taken along the line 13—13 of Figure 12;

Figure 15 is a perspective view of the end of one of the cradles used in the apparatus;

Figures 16 and 17 are sectional views of types of mounting for the cradles of the present invention;

Figure 18 is a sectional view of the preferred form of the inner compartment side, showing how it is applied between the drum plates;

Figure 19 is a bottom plan view of the compartment side of Figure 18;

Figure 20 is a top plan view of a modified form of the inner compartment side;

Figure 21 is a sectional view of one corner of the compartment side of Figure 19;

Figure 22 is a sectional view of the compartment side of Figure 20, showing the manner of assembling flasks therein;

Figure 23 is a top plan view of the preferred form of the outer compartment side, and Figure 24 is a sectional view of the compartment side of Figure 23, taken along the line 24—24 of Figure 23.

The washing machine of the present invention is adapted for use in the rapid and thorough cleansing of various types of articles such as containers. The apparatus is particularly useful in the cleansing of odd-shaped containers, and containers which may have left in them, after use, residue difficult to remove by ordinary cleaning methods. Receptacles of this type, and from which residue is difficult to remove, are used in laboratories and the like, and it is believed that the present invention eliminates the difficult problem of keeping such containers in clean and sterile condition at all times, with a minimum expenditure of time and minimum breakage. Laboratory containers may be stained with materials difficult of removal such as Agar media, wax, pencil marks, blood, salt, deposits, and various precipitations.

Containers such as test tubes, flasks, funnels, culture bottles, Petri's dishes and the like may be cleansed with facility with the washing machine of the present invention.

While the present machine is particularly adapted for the cleansing of odd-shaped containers, as mentioned above, it may easily be adapted by reason of its construction for use in cleansing any ordinary containers, such as bottles of various kinds, as well as other articles.

The invention comprises broadly, a sealed tank having mounted therein a rotatable drum. The tank contains a quantity of water or other washing liquid, and may be filled with steam or other sterilizing vapor or gas above the surface of the water. A suitable washing powder may be used in the washing liquid, if desired. One powder which thoroughly cleanses articles in a machine of the type disclosed contains soda metaphosphate which places calcium and magnesium deposits in solution without the formation of sludge, and a buffer chemical to remove hard deposits from the articles. The rotatable drum is adapted to receive at the selection of the operator, compartment forming devices for various types and numbers of containers, and rotates within the sealed tank, carrying the containers alternately and continuously through the cleansing liquid and sterilizing vapor above the liquid to thoroughly cleanse the containers.

Figure 1:
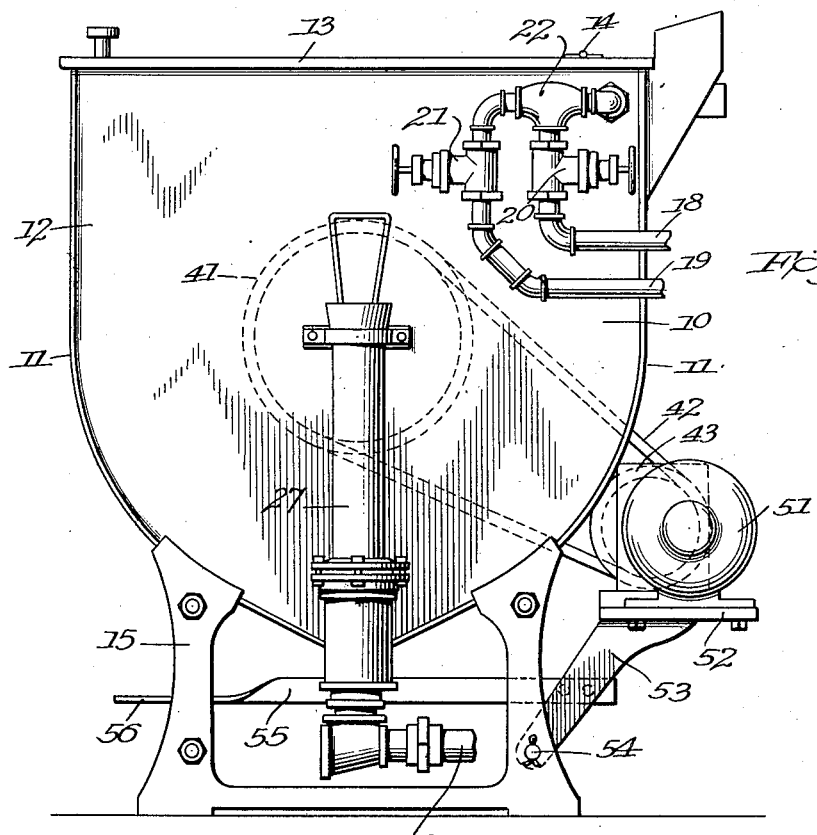
Figure 1 is a side elevational view of the washing machine of the present invention.

In Figure 1 the tank is shown at 10, and comprises sides 11 which taper toward one another at the lower end of the tank, and ends 12. The open end of the tank is covered by a lid 13 hinged as at 14, the open end of the tank and the lid having cooperating means of well-known type to permit sealing engagement in a steam-tight fit. The tank is, of course, steam-tight throughout all of its joints.

The tank is mounted on the floor by means of a suitable foundation or supporting base 15. It is supplied with either steam or water, or both, or with any other cleansing fluids and gases from the inlet pipes 18 and 19, said pipes being controlled by the respective valves 20 and 21, the inlet pipes joining one another at the fitting 22, beyond which their common extension passes through the side wall of the tank and extends into its interior in the form of a perforated supply pipe 24, which goes completely across the tank at the upper end thereof.

By suitable manipulation of the valves 20 and 21, either steam or water may be admitted into the tank, or a warm or hot spray combination of each may be injected into the tank through the perforated pipe 24. It will be understood that the perforations in this pipe are disposed on the lower face thereof, and in such position that the steam and water may be sprayed outwardly over the containers rotating within the tank as hereinafter described. The spray pipe 24 is provided with suitable means for forming a seal with the sides of the tank where it passes through the same.

Figure 4:
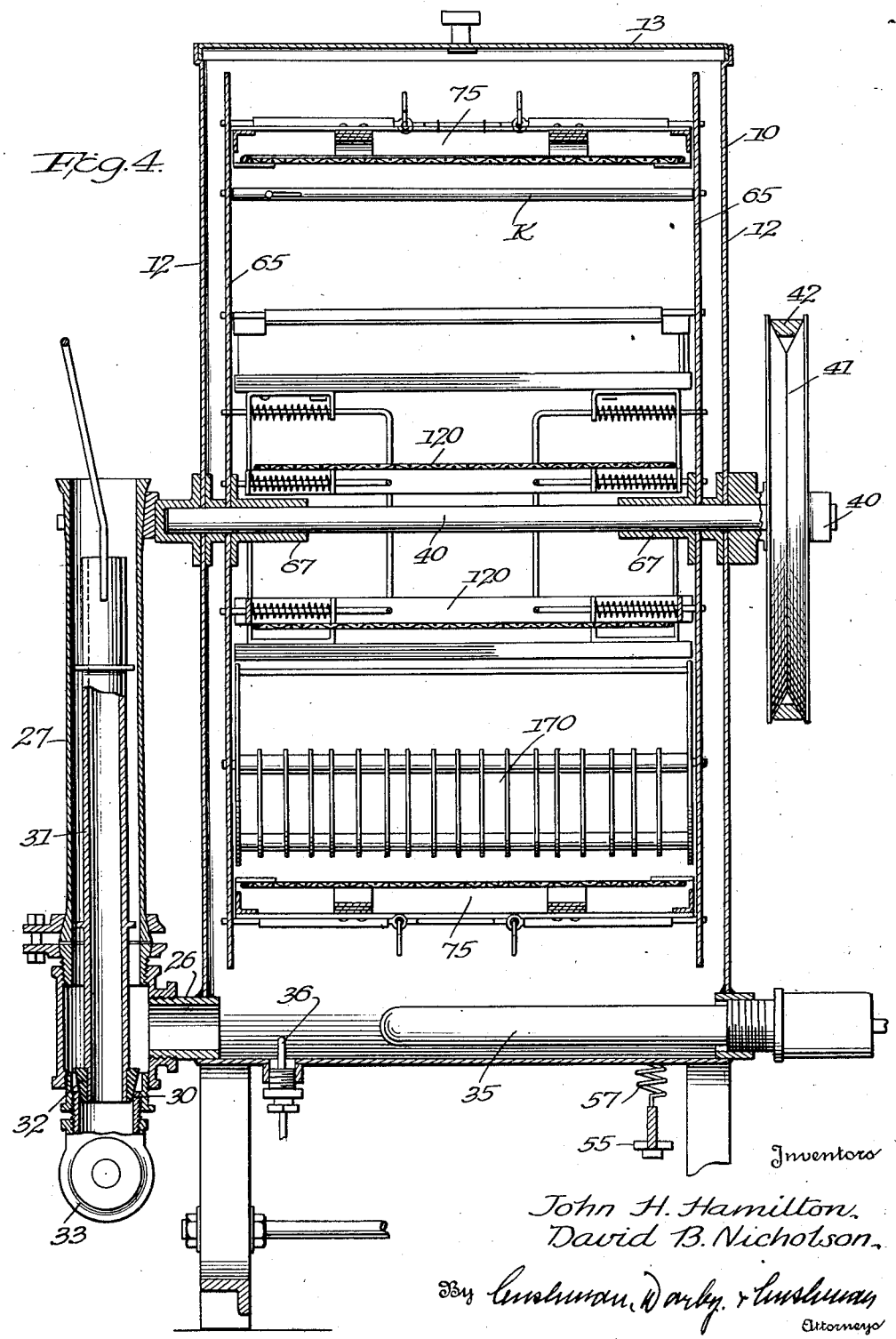
Figure 4 is another vertical sectional view of the machine, taken along the line 4—4 of Figure 3, in a plane including the axis of the machine.

As best shown in Figure 4, the tank is equipped at its lower end with an outlet 26 which is secured and sealed to said wall as by welding, said outlet communicating with an upwardly extending glass cylinder 27, and communicating with a housing including a valve seat 30 below said outlet. Mounted within the glass tube 27 is a hollow pipe 31 open at both ends which has secured to its lower end a valve member 32 which normally engages the seat 30 and prevents the direct flow of fluid from the tank through the outlet 26 and into the discharge line 33 below the valve seat 30.

When it is desired to drain the tank, the valve pipe 31 may be lifted by means of its handle extending above the upper end of the glass tube 27, thus lifting the valve 32 from its seat 30 and permitting the direct discharge of the contents of the tank into the outlet 33.

In the operation of this washer, it is intended that the same shall be in the usual case filled with liquid up to approximately the level of the center of rotation of the hereinafter described drum. The length of the valve tube 31 is such that it extends upwardly to the desired liquid level, and when the liquid rises in the tank above the upper end of the tube 31 (and consequently in the glass tube 27 which is constantly in communication with the tank through the outlet 26), the liquid overflows into the valve pipe 31 downwardly through the same directly into the discharge line 33. Thus the arrangement provided on the exterior of the tank provides for the drainage thereof, as well as for the maintenance of a proper liquid level in the tank. By reason of the transparency of the tube 27, it serves as a liquid level indicator for the tank.

As shown particularly in Figure 4, a heating element, such as an electric heating member 35 of well-known type, extends through the side of the tank and into its bottom, and said heater is adapted to either initially heat the liquid in the tank, or to retain it at the desired temperature during the operation of the washer.

Figure 2:
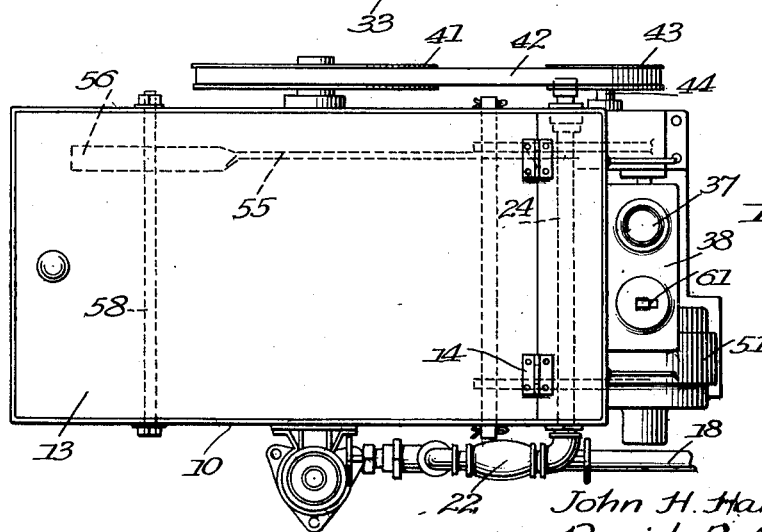
Figure 2 is a top plan view of said machine.

A thermometer 36 also extends through the lower wall of the tank, and by means of suitable electrical connections not shown, the temperature within the tank may be indicated by a thermometer 37 carried on a panel 38 secured to the upper end of one of the sides 11 of the tank as shown in Figure 2.

Figure 3:
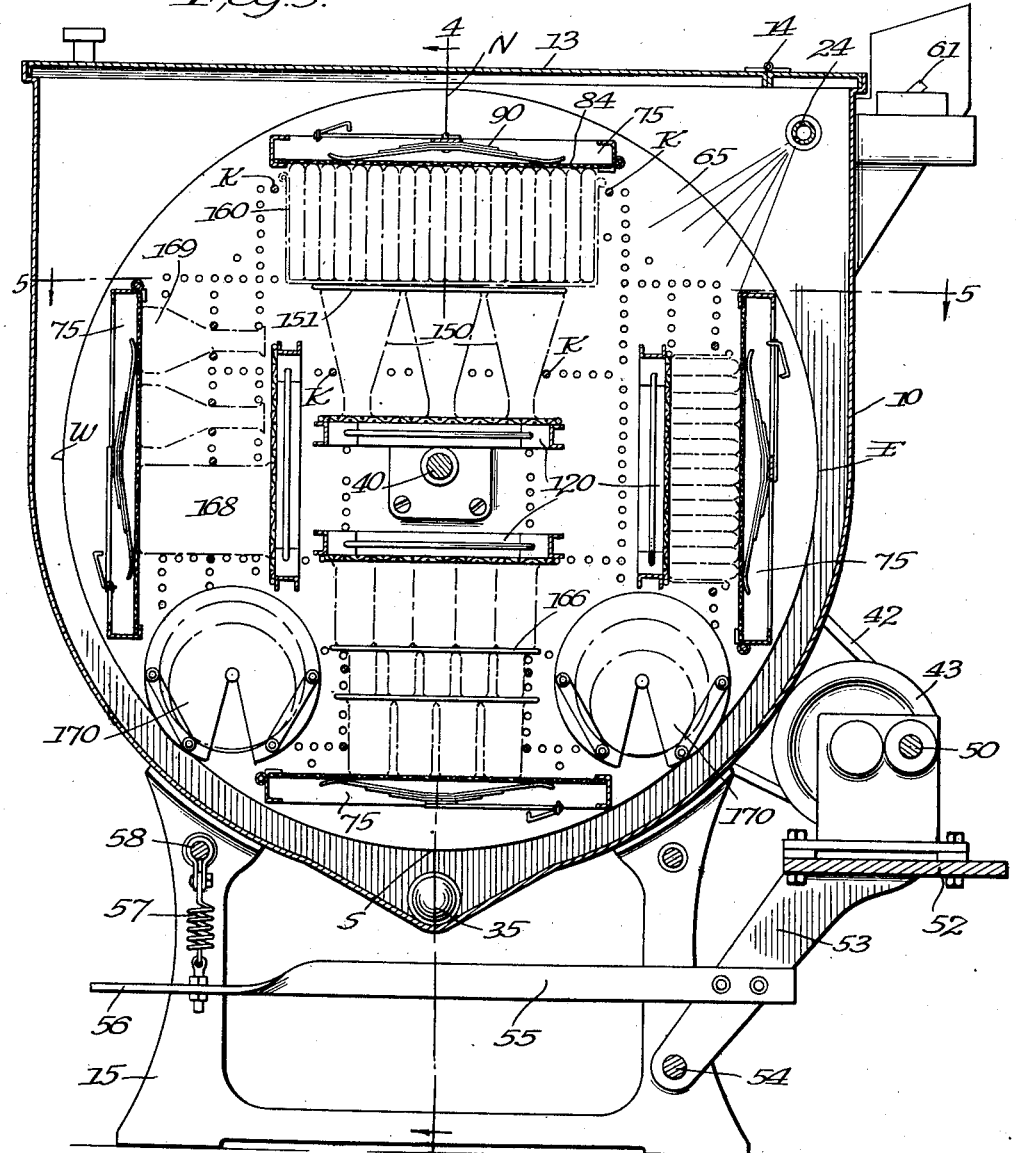
Figure 3 is a transverse vertical sectional view through the washing machine, in a plane at right angles to the axis of the machine.

The drum which carries the containers to be cleansed is mounted for rotation with a shaft 40 best shown in Figure 4, said shaft being supported in conventional bearings in each side of the tank, and having an extension on one end thereof to which is rigidly secured a driven pulley 41, said pulley receiving a belt 42 which is driven by a drive pulley 43 carried on a shaft 44 which extends from a reduction gear box 45. The driving pulley 43 is connected through the gear box 45 with a shaft 50 which is driven by any suitable source of power, such as an electric motor 51. The electric motor with its shaft, the reduction gear box and its shaft, including the drive pulley 43, are all mounted upon a supporting platform 52, said platform having a pair of brackets 53 secured to the lower face thereof which are pivotally supported at their lower ends on a shaft 54 which is secured between opposite frame members of the foundation 15. Referring particularly to Figure 3, one of the brackets 53 has rigidly secured thereto by means of a pair of bolts a foot lever 55, which extends beneath the washing machine and terminates in a foot pedal 56, this lever being normally held in its upward inactive position by a spring 57 secured to a rod 58 extending across the width of the frame members of the foundation, and secured at its ends thereto.

By this construction, the weight of the motor, gear box and drive pulley and their shafts normally tends to bias the brackets 53 in a clockwise direction around the rod 54, said brackets being pivotally attached to said rod, whereby the weight of the parts mentioned above tends to maintain tension on the belt 42 which extends to the driven pulley 41, thus completing the drive from the motor to rotate the shaft 40 on which the rotatable drum within the casing is secured for rotation. The strength of the spring 57 may be adjusted to regulate the tension on the belt 42. Said spring may be adjustably connected with the rod 58 in order to provide for varying its tension. The tension on the belt will be so maintained that it will slip on its pulley if anything becomes jammed within the tank during rotation of the drum, thus providing against breakage of either the parts of the machine or the containers.

By suitable electric connections not shown, the motor is connected with a switch 61 mounted on the panel 38 as shown in Figure 2, so that the motor may be started and stopped as desired during operation of the machine.

When it is desired to rotate the drum within the casing in order to insert or remove the containers to be washed, or to rearrange the container compartments as hereinafter described, the attendant may force the foot pedal 56 downwardly, thus elevating the platform 52 in a counter-clockwise direction around the rod 54 to relieve the tension on the belt 42, thus permitting the drum and its shaft 40 to be rotated by hand to accomplish the operations referred to above and later described in the application.

Figure 6:
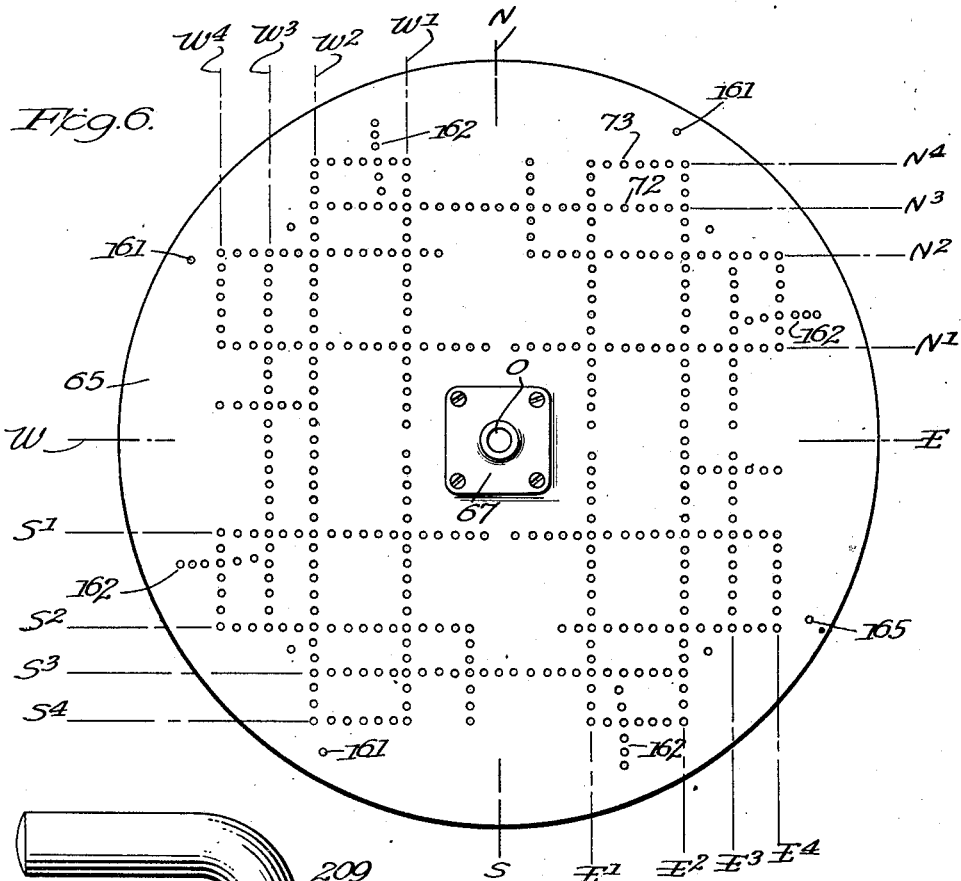
Figure 6 is an inside view of one of the end plates of the rotary drum of the machine.

As best shown in Figures 4 and 6, the rotatable drum comprises a pair of rotatable plates 65 rigidly secured to the shaft 40 by means of collars 67. These plates may be of any configuration, but are preferably circular in contour as shown in Figures 3 and 6, and are of as large diameter as possible to be conveniently accommodated within the tank without engaging the top 13 when the latter is closed, or any other fittings within the tank such as the heater 35. Each of the plates 65 is provided with a systematic series of openings as shown in Figure 6 whereby a varied number of container compartments of various sizes may be selectively formed on the drum between the discs to receive the varied number and types of containers and the like to be washed as desired. These openings may be systematically arranged in various fashions to suit the type of containers which are to be washed, and the distance apart of these openings may be likewise varied as desired.

The preferred manner of arranging these openings is shown in Figure 6, wherein for purposes of description the axes of the plate are designated NS and EW respectively, the intersection of these axes being designated O. Arranged perpendicular to the NS axis, and substantially one-quarter of the distance from the shaft 40 toward the periphery of the disc at the point N is a series of aligned openings N¹, symmetrically arranged with respect to the NS axis, the openings being of equal distance from one another throughout the series. The number of openings and their distance apart may be varied in accordance with the type of hereinafter described compartment forming equipment used, and in accordance with the type of containers which the washer is designed to cleanse. In the present embodiment, we may use thirty-six openings in the series N¹. Disposed substantially half of the distance from the axis 40 of the drum and the peripheral point N thereof is a second series of openings N², arranged in a manner identical with the series 70. Substantially five-eighths of the distance from the axis toward the point N is a shorter series of similar openings N₃, there being twenty-five openings in these series. A similar series of openings N⁴ is provided substantially three-fourths of the distance from the axis to the peripheral point N. Certain openings of each series may be omitted if not needed.

Arranged outwardly from the axis 40 toward each of the peripheral points E, S and W are similarly and symmetrically arranged series of openings as shown, the various series toward each peripheral point being arranged in perpendicular fashion to the axis of the plate through that peripheral point. These series of openings are designated with the letters E, S and W with proper exponents as described above in connection with the various series along the ON axis.

The arrangement disclosed provides means in the faces of each opposed plate for arranging various numbers and sizes of container compartments to suit the type and amount of container equipment to be washed, the compartments being formed in a manner hereinafer described.

While any type of compartment sides may be employed to form the various compartments, suitable constructions are shown in detail in Figures 8 through 14. These sides are shown as being foraminous to permit free passage of the washing fluid to and around the articles or containers.

The outer compartment side 75, or top of each compartment is shown in detail in Figures 8 through 11. These sides are adapted to be pivotally mounted in any of the openings in the circular plates 65 at one end, and swung to position and locked in openings at their other ends, as hereinafter described. This compartment side or top in general comprises a metallic frame made up of angle and channel members, carrying loosely therein a screen which is adapted to engage the containers being washed and form one side of a compartment for receiving said containers.

In Figures 8, 9 and 10, the frame comprises side angle members 76 and 77 and end channel members 78 and 79 which fit over the side angle members at the corners and are secured at the corners to the side angle members in any suitable manner, as by welding. The side angle members 76 and 77 are continuous throughout each side of the assembly, but the lower flange 80 of the end channel member 79 is bent back upon itself as at 81 (Fig. 10) between the points 82 (Fig. 8) to form a knuckle surrounding a hinge pin 83 as shown in Figure 11.

A screen 84 which actually forms the side of the container compartment is loosely positioned within the frame, resting on the lower flanges of the channel members 78 and 79. In assembling the device the screen is inserted in position with one end above or inside the lower flange of the channel 78, and then the lower flanges 80 at the ends of the channel 79 are bent in beneath the screen to support it at its other end.

In order to hold the screen rigidly against the articles which are to be positioned in the compartments, a pair of leaf springs 90 are carried beneath a cross plate 91 which extends throughout the width of the frame, the ends of the plate being secured to the upper flanges of the angle members 76 and 77, as shown in Figure 8. The leaf springs are secured at their centers to the under side of the cross plate 91 by rivets, as shown in Figure 8. The ends of the leaf springs are bowed and sprung upwardly as at 93 where they contact the upper or inner surface of the screen. It will be apparent that the screen is capable of yielding movement upwardly within the frame of the compartment side against the tension of the leaf springs, so that it may yieldingly engage the containers in the compartment.

Secured to the upper face of the channel 78, as shown in Figure 8, are a pair of spaced brackets 97 and 98, said brackets being provided with knuckles 99 and 100 which receive for longitudinal movement therein securing pins 101 and 102, said pins having pointed ends to enter any one of the selected openings 103 in the drum plates 65. The inner ends of the pins 100 and 101 are bent to form eyes 105 through which extend the outer ends of arms 106 and 107 of a U-shaped operating member of spring-like material, the inner ends of the operating arms being connected by a cross member 109 integral therewith which is secured to the outer face of the plate 91 by means of eyes 110 secured to said plate, through which said cross member extends.

The outer ends of the operating arms 106 and 107 are bent upwardly as shown at 112 to form handles, which when pulled together retract the pins 101 and 102, but which when released, will permit the spring-like quality of the operating arms to move the pins outwardly through their knuckles 99 and 100 to permit the pins to enter the selected openings 103 in the plates 65 of the drum. Suitable stop members 113 may be provided on the pins 101 and 102 to limit their inward movement.

The hinge pin 83 is hollow as shown in Figure 11, and mounted for longitudinal movement therein at one or both ends of the pin are latching bolts 116, said bolts normally being biased outwardly from the interior of the hinge pin by springs 117 within the interior of said pins. Adjacent the ends of the hinge pins, and outwardly of the ends of the knuckle 81 are slots 118, within which are operated nuts 119 secured to the bolts 116 to retract said bolts within the bore of the hinge pin when the compartment side is being secured between the drum plates, or removed therefrom.

The inner or bottom sides 120 of the compartments as shown in position in Figure 3 are also composed of a screen attached to a suitable frame and provided with latching pins or bolts to secure the same in the openings in the drum discs 65.

Referring to Figures 12 and 13 the frame of this device comprises a pair of channels 121 and 122 whose open sides face outwardly as viewed in Figure 12. The ends of the frame are provided by flat plates 124 whose ends are bent inwardly as at 125 where they are secured to the webs of the channel members 121 and 122, and the extreme ends of these members being bent inwardly away from the channel as shown at 126 and provided with openings 127 as shown in Figure 13 to receive the latching bolts hereinafter described. The screen 129 is adapted to be positioned on the upper flange of the channels 121 and 122, and is hinged to the channel 122 by spaced hinge clips 123. The end frame plates 124 are provided with openings 130 in alignment with the openings 127 in the inwardly bent ends 126 of said plate, and a U-shaped latch in the form of latching boles 131 and 132 connected by an integral arm 133 is passed through the aligned openings 127 and 130, the ends 135 of said bolts extending beyond the ends of the frame. Springs 136 surround the operating bolts between the inwardly bent ends 126 of plate 124 and the straight portion of the end plate adjacent the opening 130, washers 138 carried by the operating rods being adapted to engage the outer ends of said springs.

Figure 5:
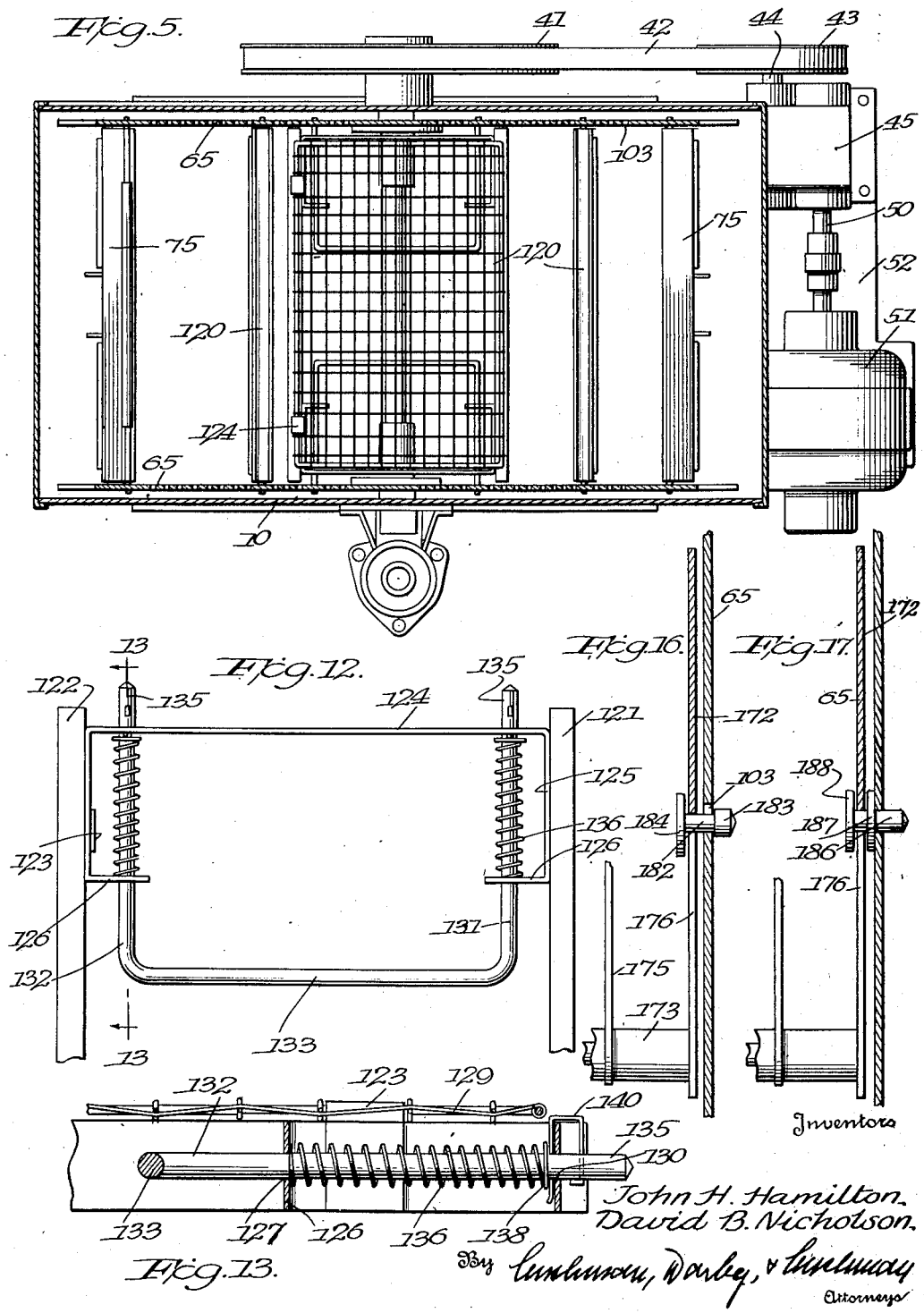
Figure 5 is a horizontal sectional view through the machine, taken along the line 5—5 of Figure 3.

With this arrangement, and referring particularly to Figures 5 and 12, the cross members 133 of the operating rods may be grasped and moved together, thus retracting the ends 135 of the operating rods to permit the securing of the bottom side in the selected position between the drum plates or its removal therefrom, it being apparent that the ends of the operating rods are adapted to enter any of the openings 103 in the series of openings in the drum discs.

In order to retain the operating latches 131 and 132 against excessive inward movement with respect to the frame, a bent wire 140 is secured to said rods at one end inside the plate 124, and is bent around the upper side of the plate and secured at its other end to the rod outside of said plate, thus limiting the inward movement of the rods with respect to the frame.

Figure 14:
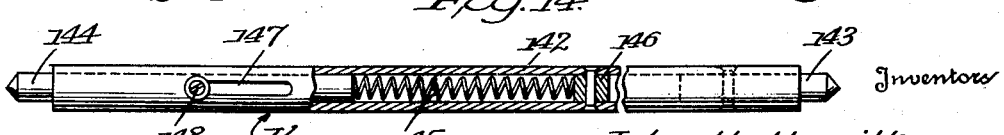
Figure 14 is an enlarged view of one of the keeper bars used in the apparatus of this invention.

In Figure 14, a keeper bar K whose use will be hereinafter described is disclosed. Generally, these keeper bars are intended to be positioned between the inner faces of the drum plates, and are used to hold the various articles in position in their compartments. These bars comprise a hollow rod 142 having fixed in one end thereof a pin 143 of a diameter adapting it to be inserted in the openings 103 in the drum plates, and a similar movable bolt 144 protruding from the other end of the hollow rod. The bolt 144 is normally pressed outwardly by a spring 145 within the rod which engages the inner end of the bolt at one end, and a fixed abutment 146 within the hollow rod at its other end. Adjacent one end, the hollow rod is provided with a slot 147 through which extends an operating nut 148 secured to the latching bolt 144. To insert the keeper bar in place between the drum plates, with the latching bolt 144 retracted, the fixed pin 143 is inserted in a selected opening on one plate, and the movable bolt is then aligned with the selected opening in the other plate, after which the attendant may release the operating bolt nut permitting the spring to move the latching bolt 144 into its selected slot.

The above described apparatus provides equipment of great flexibility which may be assembled by an attendant in a laboratory, hospital or the like, to wash any types, sizes or numbers of laboratory equipment, such as flasks, dishes and the like as hereinbefore described. The arrangements which the machine may take, as far as the formation of compartments is concerned, are almost innumerable. However, as illustrative of the manner in which the device may be used, one assembled arrangement which has been used is disclosed in Figure 3.

In this figure, one of the bottom sides 120 of the invention, the details of which are illustrated in Figures 12 and 13, is secured between the faces of the drum plates 65 along the ON axis of the drum plates as close to the axis 40 of the drum as convenient. The distance between the latching bolts 135 of this side is conveniently made equal to the distance between the series of openings $E^1$ and $W^1$ as shown in Figure 6. With the bottom plate of the compartment in position by retracting its latching bolts and permitting them to enter the selected openings in the drum plates, any type of container may be assembled above the same, but in the illustrated arrangement three relatively long flasks 150 are positioned on the screen of the bottom plate with their mouths facing generally toward the axis of the drum. The flasks may be held in place by as many keeper bars as necessary as shown in Figure 3 at K positioned in the series of openings $N^1$ of Figure 6. A small plate preferably of screen-like material 151 may be positioned on the bases of the flasks, and on this screen may be set a plain wire basket 160, of proper size, containing a plurality of test tubes which will also be conveniently disposed with their open ends facing generally toward the axis of the drum.

The top plate 75 may now be positioned in place, and while it may be pivoted in place in any of the openings 103 desired, it is preferred to have a special opening 161 disposed as shown in Figure 6, in which openings the hinge pins 116 of the top side of Figures 8 and 11 may be inserted, in the manner previously described.

Three special openings 162 are provided along the line of an arc struck with a radius equal to the distance between the hinge pins 116 and the latch pins 101 and 102 of Figure 8, so that said latch pins may be positioned in any one of the openings 162 desired, depending on the size of the containers which have been assembled within the compartment. The outside or top side 75 may be moved radially toward the upper end of the basket 160 of test tubes until a tight fit is secured, and then latched in the proper opening 162, it being apparent that the screen 84 of the top plate will engage the upper open face of the basket to retain the test tubes therein, and the leaf springs 90 will provide a yielding engagement of the top side with the basket.

It may be found to be convenient to leave the top side 75 permanently pivoted within its openings 161, and to build the various compartments inside the same, using side 75 as the final closure for the compartment as formed.

If desired, any number of keeper bars disclosed in Figure 14 may be employed at the sides of the basket 160, if it is necessary to use them in retaining the basket in fixed position.

After having thus assembled the containers in one section of the drum, they may be washed, or the drum may be completely filled with containers. If it is desired to insert additional containers for washing, the operator presses down on the foot lever 56 to release the drum shaft 40 from its driving means, and then by hand he rotates the drum until an empty space is available in another section to insert further containers. For instance, he may rotate the drum through 90° until the peripheral point E of the drum is at the uppermost part of the tank, and then dispose a bottom compartment side 120 through any pair of aligned openings as desired. As illustrated in Figure 3, the attendant has secured the bottom side of the compartment to be formed along the OE axis between selected openings in the series of openings $N^1$ and $S^1$ of Figure 6. As previously described, a basket of small test tubes may be mounted on the bottom side 120, with the mouths of the tubes extending generally inwardly toward the axis of the drum, after which the top side 75 is secured in its opening 165 and swung counter-clockwise until it holds the basket of tubes tightly against the bottom face 120, after which the top side may be latched in its selected one of the openings 162.

The drum may then be further rotated through a further 90° angle after releasing the driving means to bring the peripheral point S to the uppermost position within the tank. After the securing of the bottom side 120 between selected openings in the series $E^1$ and $W^1$ of Figure 6 further equipment may be inserted in this section of the drum as previously described. For instance, a plurality of micro-slides in a basket or in any type of open box-like holders may be positioned on the bottom side 120, a simple screen 166 may be placed over said holders after which a plurality of small beakers may be set on this screen with their mouths facing inwardly, these beakers being surmounted by a further screen after which larger beakers may be similarly mounted and then a top side 75 may be positioned between the drum plates as previously described. Keeper bars as shown may be appropriately positioned between the drum plates in selected openings and at the sides of the rows of beakers as desired, and as necessary to hold them in place.

The drum may then be rotated to bring the peripheral point W uppermost, after which the relatively large flasks and beakers may be positioned as shown in the left-hand section of Figure 3. In this view, the bottom side is secured between the series of openings $N^1$ and $S^1$, and a large beaker 168 is positioned on the bottom side. For purposes of illustration, this assembly discloses the side-by-side mounting of this beaker with flasks 169 of shorter length, the flasks being retained by keeper bars which closely embrace the necks of the flasks, and hold them with their mouths spaced from the bottom side of the compartment. In this arrangement, the top side can be secured as before and by means of its leaf spring and yieldably mounted bottom screen, the flasks and beaker will be rigidly yet yieldingly held in position.

It is obvious that the flexible and selective arrangement of compartment formation described above permits the utilization of substantially the entire volume of space between the drum plates, and within the tank, even if containers of widely different sizes and shapes are to be washed in a single batch.

The entire assembly is such that after all or any part of the articles described above have been assembled, the drum can be rotated at any reasonable speed desired without causing the delicate contents to move about into engagement with each other, and without any appreciable noise and particularly without the danger of breakage.

It is sometimes necessary to wash dishes such as Petri dishes which comprise top and bottom dish portions which accurately fit one another to seal the contents between the dishes during certain laboratory work. Usually these dishes comprise sections which are not of the same diameter, yet it is desirable to keep them together yet not sealed with one another during the washing operation, as one dish may not fit the corresponding top of another set with sufficient accuracy.

In order to wash such dishes, we have devised the cradle arrangement 170 shown in Figure 15, this cradle comprising a pair of circular end plates 172 which are connected by four longitudinally extending bars 173 and 174, the upper pair of bars 174 being spaced a wider distance apart than the lower pair of bars 173. To support the mating pairs of the Petri dishes, transverse struts 175 are provided throughout the length of the cradle secured between the longitudinal bars 173 and 174. Each of the end discs is provided with a segmental slot 176 which terminates in a circular opening 177 at the center of the end plates, or slightly above the center thereof if desired. At a point opposite the segmental opening 176, the end plates are provided with openings 178 adapted to receive a keeper bar K of the type described in connection with Figure 14.

The mating sets of Petri dishes are positioned in this cradle in parallel relation with the end plates 172, with each mating set between a pair of the tranverse struts 175, the mating dishes not being in sealing engagement with one another. To retain them in place, the keeper bar K is then inserted between the end plates 172.

Referring to Figure 16, one of the drum plates is shown at 65 and one of its openings is shown at 103 and a novel form of bolt is disclosed which may be used to removably secure the cradle between the drum plates. This bolt has a relatively small shank 182 terminating in a relatively large head 183, the shank being inserted through the opening 177 in the end plates and extending through the opening 103 in the drum plate. The head 183 is of small enough diameter to pass through any one of the openings 103 in the drum disc 65, but when inserted, the shoulder between the enlarged end 183 and the shank 182 bears against the outer face of the drum disc 65 as shown, and will prevent the bolt from being withdrawn during rotation of the drum. The head 183 of this bolt is not of sufficient length to engage the inner wall of the tank during rotation of the drum. The bolt is provided with an inner flange portion 184 which is positioned within the inner wall of the end plate 172 of the cradle.

With the Petri dishes assembled in the cradle as previously described, and after the keeper bar K of the cradle is positioned as shown in Figure 15, the cradle may be buttoned into a selected pair of aligned openings in the drum disc 65 wherever sufficient space is offered, depending on the rest of the assembly which has been made as described in connection with Figure 3. In this figure, one of the cradles 170 is shown in position between the compartment assembly on the OE axis and the assembly on the OS axis, and another between the assembly on the OS axis and that on the OW axis. However, it will be understood that the disposition of these cradles is not limited other than by the other compartments which have been previously formed between the drum discs. If desired, the space between the drum plates could be completely filled with these cradles.

When the cradles have thus been assembled, and when the drum is rotated during the washing operation, the weight of the contents of the cradle, together with the weight of the bars 173 and 174 and the struts 175, being below the central axis extending through the openings 177 in the end plates of the cradle, will insure that the cradle remains in its upright position during rotation of the drum. That is, referring to Figure 16, while the retaining nut will move around with the drum, during rotation of the drum, the end plate 172 of the cradle will move around the retaining nut as the drum rotates, thus keeping the cradle in its upright position.

It will be understood that this is desirable in connection with the washing of these particular dishes, and may be desirable in connection with the washing of other containers. By reason of the fact that the mating Petri dishes are of unequal diameter, even if provision were made to retain the larger dishes rigidly in place by disposing the keeper bar K in engagement with their periphery, this would still not keep the smaller dishes from moving and perhaps being subject to breakage during the rotation of the drum incident to the cleaning operation. It will be understood that any types of miscellaneous dishes or articles may be carried in the cradles described above.

In Figure 17, a modified form of the bolt for retaining the cradle in position is disclosed, this bolt having a shank 186 and a pair of flanges 187 and 188 integral therewith, flange 188 being inside of the end plate 172 of the cradle and flange 187 being between said plate and the inner wall of the drum plate 65.

In lieu of the removable bolts for holding the cradles between the drum plates, as shown in Figures 16 and 17, fixed bolts having enlarged heads may be permanently secured to the inner faces of the drum plates, and the cradles pivoted thereon by passing the slots 176 in the end plates of the cradles over the enlarged heads of the bolts until the bolts are in the openings 177 in the end plates. These permanently located bolts may be disposed between the assemblies in the ON, OE, OS and OW axes, as shown in Figure 3.

In operation, the attendant forms compartments of various sizes, and any number of compartments as desired, arranged to suit the types of containers to be washed as described in connection with Figure 3, the drum being rotated by hand to bring empty sections of the drum to the top of the tank when other sections have been filled. The keeper bars may be used as liberally as desired, and in some instances it may even be convenient to only use keeper bars to form the compartments and hold the containers in place. For instance, such containers as the flasks 169 could obviously be held in place merely with the use of keeper bars.

After the compartments are formed and the containers assembled therein, the valves 20 and 21 are opened to admit water and/or steam into the tank, the tank filling to a level in alignment with the top of the valve tube 31, it being evident that the pipe 24 will spray the water or other washing fluid over the containers in the drum. The top of the tank is then closed and sealed, and the switch 61 operated to start the motor which rotates the drum preferably slowly, but as fast as desired in accordance with the gear train in the gear box 45. During rotation of the drum, the containers will be alternately immersed in the water in the lower part of the tank, and then raised to an elevation above the water level in the upper part of the tank. When so elevated, the containers will be subjected to a spray of water and/or steam from the pipe 24. During the operation of the drum, the water or other fluid in the bottom of the tank can be kept heated by means of the electric heater 35, and this heat may be regulated by observations of the indicator 37 which is actuated by the thermometer 36. If desired, after the water has been supplied to the tank, only steam may be admitted through the pipe 24, or steam and a slight amount of hot water to form a cloud-like spray in the upper part of the tank above the water level. The atmosphere above the water level may be all steam. In place of the electric heater 35, a steam pipe having a plurality of jet openings therein may be used in the bottom of the tank, so that steam can be blown up through the liquid in the tank to rapidly heat the liquid.

As the containers were positioned in their compartments generally with their mouths facing toward the axis of the drum, these containers will fill with liquid when in the lower part of the tank, and will discharge this liquid when passing through the cycle at the upper part of the tank, and during this upper cycle the steam previously trapped within the containers will tend to expand and assist in discharging fluid from them, thus providing an alternate filling and discharging of the containers which results in a thorough cleansing action. The speed of rotation of the drum will preferably be slow enough so that the containers have time to become filled during the lower part of the cycle of rotation.

It may be desirable to keep the temperature of the steam atmosphere above the liquid level higher than the temperature of the liquid to increase the filling and discharging action of the containers. However, the temperature throughout all parts of the tank may be the same.

The time necessary to wash various articles will vary. Some articles with certain residue to be removed may require only ten minutes, while other articles may require forty minutes.

Usually a temperature of 160° F. or less within the tank is sufficient. However, in removing certain residue, a temperature of 212° F. or higher may be desirable. The time necessary to cleanse various types of containers and to remove different stains of course varies to an extent with the temperatures used.

If desired, the machine may be started at a relatively low temperature, and the heat increased as the operation progresses, by increasing the heat applied by the electric heater, or by admitting more steam.

If steam is not available at the place where the washer is used, the electric heater may be relied on solely to supply the necessary heat.

After the washing operation is completed, the containers may be left in place in their compartments until needed, and the drain valve 32 may be opened to permit discharge of the washing fluid at the completion of the operation, and, of course, the valves 20 and 21 may be closed to prevent any further inlet of steam and water into the tank. If desired, immediately after the washing operation as described above, the fluid may be drained from the tank by opening the valve 32, and then the containers may be thoroughly rinsed, preferably with cold water forced inwardly through the pipe 24, or with warm water if desired. The drum may or may not be rotated during this rinsing operation.

After draining the liquid from the tank, it may be completely filled with steam to sterilize the containers, and if desired, this steam atmosphere may be maintained as long as desired.

It will be understood that the machine need not be completely filled with containers in each washing operation, nor is it necessary to remove all of the containers after one operation. It may be the case that some containers need to be washed for a considerably longer period than others, and, therefore, these containers difficult to clean may be left in the machine during several washing operations. Between successive washing operations certain of the other compartments may be opened and the containers removed and replaced, and possibly some of the compartments changed in order to accommodate different types of containers.

If during the washing operation, the temperature of the fluid in the bottom of the tank is relatively low with respect to the steam in the upper portion of the tank, a very thorough washing of containers of the type having restricted necks may be effected. That is, when these containers pass through the liquid in the lower part of the tank, they will be cooled and the air therein will be condensed, thus drawing the liquid into the interior of the containers. On the other hand, when the containers pass through the upper cycle of the drum and through the relatively hot steam, the air trapped within the containers will be caused to expand, thus forcing the liquid from the containers. Thus, during each rotation of the drum, such containers will be partially filled with liquid and then will be caused to expel the same, thus thoroughly cleansing their interiors.

If the machine is to be used for the storage of containers after the washing operation is completed, it may be desirable after the liquid has been withdrawn, to fill the tank with steam by slightly cracking the steam inlet valve 20. If it is desired to keep steam in the drum under any considerable pressure for sterilizing, any suitable type of valve may be employed to close the outlet 26, and a more rugged steam-tight top may be provided for the tank, as shown in Figure 7.

Figure 7:
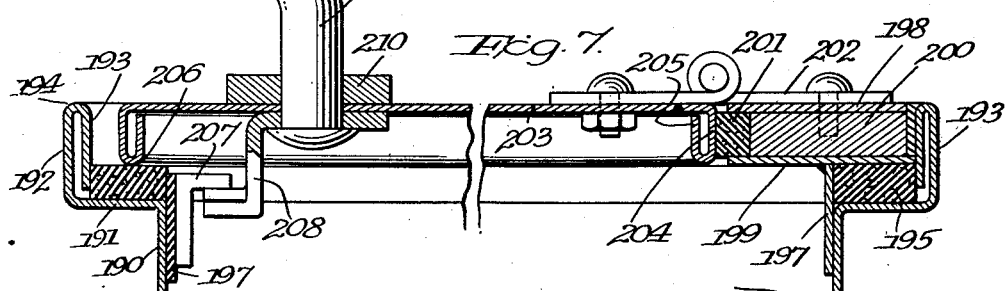
Figure 7 is a detail sectional view of a modified form of lid for the tank of the machine.

In Figure 7, a modified form of top for the tank is disclosed. The tank is shown at 190, and on all four sides thereof the metal of the tank is bent outwardly at 191 to form a horizontal flange, and upwardly at 192 and downwardly upon the upwardly bent portion at 193 to present a smooth upper tank edge 194. Secured upon the ledge 191 is a one-piece gasket member 195 which extends completely around the tank. This gasket is held in place between the bent down flange 193 and a gasket retaining flange 197 which is secured in any suitable fashion as by soldering or welding to the inner wall of the tank.

Throughout the length of the back side of the tank a pair of plates 198 and 199 having a brass filler 200 therebetween are secured as by welding or soldering to the flanges 197 and 193. These plates form a channel at their inner sides wherein is received a second gasket member 201 which extends only throughout the back side of the tank. A hinge 202 is bolted to the brass reinforcement 200 and to the lid 203, the lid also having a bent edge throughout its entire circumference, being bent downwardly at 204, and upwardly upon the bent down portion 204 as at 205, forming a rounded edge 206 which engages the gasket 195 to form a seal therewith throughout three sides of the tank. On the rear side of the tank, the bent down flange 204 of the top forms a seal with the gasket 201 when the top is closed. Secured to the gasket retaining plate 197 at the front side of the tank is an angle member 207 which has a lower cam latching face adapted to engage a latching member 208 having a cooperating cam face which is secured for rotation with an operating handle 209 which is mounted in the top 203, extending through the apertured plate 210 which is secured to the top. The operating handle 209 may be provided with a suitable collar (not shown) outside of the plate 210, and bearing against said plate, so that there is no inward movement of said handle through the top 203.

With the above described arrangement, the top may be brought into steam-tight engagement with the tank, to permit relatively high pressures to be used within the tank during the washing operation, or during any desired sterilizing operation.

In Figures 18 through 21, the preferred form of the inner or bottom compartment side 120 is disclosed. This compartment side is used for the same purpose as that disclosed in Figures 12 and 13, and is substantially of the same construction, comprising a frame and a foraminous plate carried by the frame and covering the same. However, in this embodiment a different means for securing the side between the drum plates 65 is provided. At one end of the frame fixed pins 213 are provided, said pins being adapted to enter selected openings 103 in one drum plate 65, as will be understood. In the opposite end of the frame, slots 215 are provided extending through the wall of the frame. Pivoted at 217 within the frame and coextensive with the latching end thereof is a latching frame 219, said frame carrying a pair of latching pins 221 rigidly secured to the end of the latching frame. The pins 221 are adapted to enter the slots 215 in the ends of the main frame.

This bottom compartment side is inserted between the drum plates 65 as shown in Figure 18. During insertion, and with the latching frame moved downwardly around its pivot 217 from the main frame, the fixed pins 213 on the main frame are inserted into the selected openings in one drum plate. With the main frame then in the position shown in Figure 18, the pins 221 extending from the latching frame are inserted into corresponding openings in the other drum plate, after which the main frame is pushed downwardly at its latching end until it snaps over into parallel relation with the main frame as shown in Figures 19 and 21, the pins 221 entering the slots 215. A spring latch 223 is secured to the end of the main frame as shown in Figures 18 and 19, which latch moves in below the end of the latching frame when the pins 221 have entered their slots. This spring holds the latching frame as an integral part of the main frame, so that the compartment side is rigidly secured between the drum plates. When so secured, the compartments may be formed outside of this side as described in connection with Figure 3. This compartment side can be quickly released when desired by retracting the spring 223 and collapsing the frame by drawing the main frame upwardly from the latching frame as shown in Figure 18, after which the compartment side may be removed.

In Figure 21, the screen 225 is shown removably held to the frame by brackets 227 which are secured to the side of the frame and extend up over the screen. These brackets are arranged as shown in Figure 20 so that the screen can be removed and a container supporting plate 229 having a plurality of openings 231 may be substituted therefor. That is, the screen is slidably mounted in the frame so that it may be quickly removed and the plate 229 slid into place beneath the brackets 227.

The openings 231 in the plate 229 are for the purpose of receiving the necks of containers, such as flasks, in order to further save space and simplify the assembly between the drum plates.

As shown in Figure 22, after the bottom compartment side is positioned between the drum plates, the flasks 233 are retained therein by having their necks inserted through the openings 231, instead of having the mouths of the flasks resting on the inner compartment side as shown in Figure 3. As in Figure 3, a screen plate 151 may be positioned over the bases of the flasks and the remainder of the assembly mounted outside of this plate, such as, for instance, a wire basket 160 containing test tubes or the like.

In Figure 23, a preferred construction of the outer compartment side 75 is disclosed. This construction comprises a frame having a yieldably mounted screen therein of the same construction as described in connection with Figures 8 through 11. In this construction, the screen 235 is held in place by brackets 237 which are secured to the frame, the screen being mounted over the brackets as shown in Figure 23 to permit the screen to move with respect to the frame against the tension of the leaf springs. This compartment side is pivoted at one end in aligned openings in the drum plates 65 by a removable keeper bar 239 which has one fixed pivot pin 241 and one spring pressed latching bolt 243 operated by the nut 245 secured to said bolt, said nut moving in a slot in the keeper bar in the same manner as does the nut 119 disclosed in Figure 11. This keeper bar is carried in aligned apertures in extensions 246 of the frame.

At the opposite end of this compartment side, and secured to the frame, is a pair of brackets 249 having apertures therethrough to receive another keeper bar 251, this bar having spring pressed latching bolts 253 at each end, which are operated by the closely adjacent operating nuts 255 secured to said bolts, said nuts being movable in slots in the hollow sleeve which houses the latching bolts. The operating nuts 255 are close enough together so that they may be operated with one hand to retract the bolts 253 when the compartment side is being secured between or removed from the drum plates 65. Small key plates 257 are secured to the brackets 249 as shown in Figure 24, the keys entering slots in the outer wall of the keeper bar to retain said bar against longitudinal movement in the apertures in the brackets 249.

This type of compartment side can be positioned between the drum plates 65 in a manner obvious from the above description of this preferred embodiment, as well as the description given in connection with the embodiment of Figures 8 through 11.

It will be obvious that the invention provides a washing machine of great utility and of wide application, as the flexibility of its construction permits its accommodation to widely different types and sizes of containers.

The equipment within the machine, such as the drum plates, article trays, keeper rods, spray pipe and the like, are preferably made of brass. The body of the machine is preferably made of stainless steel or Monel metal.

The details of the construction shown herein may be changed to a considerable extent without departing from the invention, and it will be understood that the machine disclosed is susceptible of a great variation in size in order to adapt it for different uses. It is also evident that the apparatus shown herein may be modified to receive articles other than containers.

We claim:

1. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, said compartments utilizing substantially the entire volume of space between said plates.

2. In a washing machine, a tank, a rotatable drum in said tank comprising a pair of opposed end plates disposed closely adjacent to the walls of said tank, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, latching means on the ends of said devices operable from between said plates and adapted to enter selected of said openings in said plates, whereby a varied number of compartments of various sizes and shapes may be formed between said plates, to accommodate different sizes and shapes of articles to be washed.

3. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, one of said devices being a foraminous plate for forming one side of a compartment.

4. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, said devices including a foraminous plate for forming one side of a compartment and a keeper bar for holding the articles in place in said compartment.

5. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, one of said devices being a compartment side comprising a frame and a screen removably secured to said frame.

6. In a washing machine, a rotatable drum comprising a pair of opposed end plates, each of said plates having a multitude of systematically arranged openings therein throughout a major portion of the area of said plates, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, one of said devices being a compartment side comprising a frame, a screen mounted for movement in said frame, and spring means on said frame for yieldingly urging said screen into engagement with the articles in a compartment.

7. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, said devices including a pair of foraminous plates for forming opposite sides of a compartment.

8. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, said devices including a pair of foraminous plates for forming opposite sides of a compartment, and keeper bars for retaining the articles in the compartment between said plates.

9. In a washing machine, a rotatable drum comprising a pair of opposed end plates, each of said plates having a multitude of systematically arranged openings therein throughout a major portion of the area of said plates, said systematic arrangement comprising a plurality of non-radial parallel lines of openings, and a second plurality of parallel lines of openings which are arranged perpendicular to said first-named lines of openings, a plurality of removable compartment forming devices of length substantially equal to the distance between the inner faces of said plates, said devices having means at their ends to latch in selected of said openings in said plates, whereby a varied number of compartments of various sizes and shapes may be formed between said plates to accommodate different sizes and shapes of articles to be washed, a cradle for receiving articles to be washed, and cooperating means on said cradle and said plates for supporting said cradle between said plates in a constantly upright position during rotation of said drum.

10. In a washing machine, a drum comprising a pair of spaced plates having openings therein, a removable compartment side adapted to be positioned between said plates comprising a frame, a screen mounted on said frame, a plurality of latching bolts carried by said frame and having ends extending beyond said frame to engage in said openings, means on said frame for urging the ends of said bolts into said openings, and operating means connecting said bolts whereby their ends may be simultaneously withdrawn from said openings against the force of said urging means.

11. A removable compartment side for a washing machine for containers and the like comprising a frame, latching bolts carried by said frame for securing the same between plates of the drum of a washing machine, and a container supporting plate mounted on said frame, said plate having a plurality of openings therein through which the necks of the containers may be inserted, said frame comprising pivoted sections adapted to be moved into parallel relation with one another when the frame is disposed between the plates of the drum, each section of said frame carrying said latching bolts for engaging one of the plates of the drum of the washing machine.

12. In a washing machine, a rotatable drum comprising a pair of spaced plates having openings therein, means for forming article receiving compartments in said drum, said means including a compartment top side comprising a frame, a screen mounted for movement in said frame, means on one side of said frame at each end thereof for pivoting said frame between said plates, retractable means on the other side of said frame at each end thereof for latching said frame in selected of said openings in said plates, and spring means on said frame for yieldingly urging said screen toward the axis of rotation of said drum.

13. In a washing machine, a rotatable drum comprising a pair of spaced discs, said discs having a multitude of systematically arranged compartment side receiving openings therein covering substantially their entire area, said openings being arranged in four groups of parallel lines of openings, each group extending at right angles to one of four axes a quadrant's distance apart extending from the centers of said discs, openings in one disc being in alignment with corresponding openings in the other disc, and removable compartment forming devices adapted to be secured between corresponding openings in said discs.

14. In a washing machine, a drum comprising a pair of spaced plates having openings therein, a compartment side adapted to be positioned between said plates comprising a main frame, a pair of latching bolts secured to one end of said main frame, a pair of slots in the opposite end of said main frame, said bolts being adapted to enter openings in one of said drum plates, a latching frame pivoted to said main frame and fitting the end thereof which is provided with said slots, a second pair of latching bolts secured to the end of said latching frame and being adapted to enter openings in the other of said drum plates, said second pair of latching bolts being received in said slots to secure said compartment side between the plates of said drum.

15. In a washing machine, a rotatable drum comprising a pair of spaced plates having openings therein, an article receiving cradle mounted between said plates for rotation with said drum, said cradle comprising a pair of end discs, and means extending between said discs forming a support for the articles to be washed, each of said discs having the lower portion thereof cut-out, said cut-out terminating in a bearing portion adjacent the center of the discs, and each of said discs having a removable pivot bolt with a journal portion in the bearing portion of said cut-out and extending through an opening in one of said plates, said bolt having an enlarged head on the inner side of said disc and an enlarged head on the outer side of said plate, said last named head being small enough to pass through the opening in said plate.

16. In a washing machine, a rotatable drum comprising a pair of spaced plates having openings therein, an article receiving cradle mounted between said plates for rotation with said drum, said cradle comprising a pair of end discs, and means extending between said discs forming a support for the articles to be washed, each of said discs having the lower portion thereof cut-out, said cut-out terminating in a bearing portion adjacent the center of the discs, and each of said discs having a removable pivot bolt with a journal portion in the bearing portion of said cut-out, and an outer end extending through an opening in one of said plates, said bolt having flanges on opposite sides of said disc at the bearing portion thereof.

JOHN H. HAMILTON.
DAVID B. NICHOLSON.